(12) United States Patent
Nakano et al.

(10) Patent No.: US 9,457,424 B2
(45) Date of Patent: Oct. 4, 2016

(54) LASER MACHINING DEVICE

(75) Inventors: Makoto Nakano, Hamamatsu (JP);
Takashi Inoue, Hamamatsu (JP)

(73) Assignee: HAMAMATSU PHOTONICS K.K.,
Hamamatsu-shi, Shizuoka (JP)

( * ) Notice: Subject to any disclaimer, the term of this patent is extended or adjusted under 35 U.S.C. 154(b) by 941 days.

(21) Appl. No.: 13/131,429

(22) PCT Filed: Nov. 20, 2009

(86) PCT No.: PCT/JP2009/069722
§ 371 (c)(1),
(2), (4) Date: Jun. 28, 2011

(87) PCT Pub. No.: WO2010/061794
PCT Pub. Date: Jun. 3, 2010

(65) Prior Publication Data
US 2011/0266261 A1    Nov. 3, 2011

(30) Foreign Application Priority Data

Nov. 28, 2008    (JP) ................................ 2008-305143

(51) Int. Cl.
*B23K 26/00*    (2014.01)
*B23K 26/03*    (2006.01)
(Continued)

(52) U.S. Cl.
CPC ........... *B23K 26/0057* (2013.01); *B23K 26/03* (2013.01); *B23K 26/046* (2013.01);
(Continued)

(58) Field of Classification Search
CPC  B23K 26/0057; B23K 26/06; B23K 26/046; B23K 26/048; B23K 26/063; B23K 26/0643; B23K 26/0853; B23K 26/4075

USPC ........... 219/121.67, 121.68, 121.69, 121.72, 219/121.73, 121.74
See application file for complete search history.

(56) References Cited

U.S. PATENT DOCUMENTS 4,546,231 A    10/1985  Gresser et al.
5,414,239 A *  5/1995  Terabayashi et al. ... 219/121.73
(Continued)

FOREIGN PATENT DOCUMENTS

CN    1160228 A    9/1997
JP    H07-24589 A   1/1995
(Continued)

OTHER PUBLICATIONS

Machine Translation of JP2003071828 of Junichi.*
(Continued)

*Primary Examiner* — David Angwin
*Assistant Examiner* — Amit K Singh
(74) *Attorney, Agent, or Firm* — Drinker Biddle & Reath LLP

(57) ABSTRACT

A laser machining device which can suppress the aberration of a laser beam converged into an object to be machined is provided. The device includes a laser light source for emitting a laser beam and a reflective spatial light modulator for modulating the laser beam emitted from the laser light source (202), while first mirrors for reflecting the laser beam are disposed between the laser light source and reflective spatial light modulator in an optical path of the laser beam and configured such as to be able to adjust the direction of reflection of the laser beam. Therefore, by regulating the direction of reflection of the laser beam at each of the mirrors, the device can adjust the position and incident angle of the laser beam incident on the reflective spatial light modulator as desired. Hence, the laser beam can precisely be made incident on the reflective spatial light modulator.

3 Claims, 13 Drawing Sheets

US 9,457,424 B2
Page 2

(51) Int. Cl.
  *B23K 26/04* (2014.01)
  *B23K 26/08* (2014.01)
  *C03B 33/02* (2006.01)
  *B23K 26/40* (2014.01)

(52) U.S. Cl.
  CPC ......... *B23K26/048* (2013.01); *B23K 26/0622* (2015.10); *B23K 26/0853* (2013.01); *B23K 26/40* (2013.01); *C03B 33/0222* (2013.01); *B23K 2201/40* (2013.01); *B23K 2203/50* (2015.10)

(56) References Cited

U.S. PATENT DOCUMENTS

| | | | |
|---|---|---|---|
| 5,589,955 A * | 12/1996 | Amako et al. | 359/9 |
| 6,992,026 B2 | 1/2006 | Fukuyo et al. | |
| 7,145,710 B2 * | 12/2006 | Holmes | 359/279 |
| 7,396,742 B2 | 7/2008 | Fukuyo et al. | |
| 7,489,454 B2 | 2/2009 | Fukuyo et al. | |
| 7,547,613 B2 | 6/2009 | Fukuyo et al. | |
| 7,566,635 B2 | 7/2009 | Fujii et al. | |
| 7,592,237 B2 | 9/2009 | Sakamoto et al. | |
| 7,592,238 B2 | 9/2009 | Fukuyo et al. | |
| 7,605,344 B2 | 10/2009 | Fukumitsu | |
| 7,608,214 B2 | 10/2009 | Kuno et al. | |
| 7,615,721 B2 | 11/2009 | Fukuyo et al. | |
| 7,626,137 B2 | 12/2009 | Fukuyo et al. | |
| 7,709,767 B2 | 5/2010 | Sakamoto | |
| 7,718,510 B2 | 5/2010 | Sakamoto et al. | |
| 7,719,017 B2 | 5/2010 | Tanaka | |
| 7,732,730 B2 | 6/2010 | Fukuyo et al. | |
| 7,749,867 B2 | 7/2010 | Fukuyo et al. | |
| 7,754,583 B2 | 7/2010 | Sakamoto | |
| 7,825,350 B2 | 11/2010 | Fukuyo et al. | |
| 7,851,724 B2 * | 12/2010 | Hiiro | 219/121.66 |
| 7,897,487 B2 | 3/2011 | Sugiura et al. | |
| 7,902,636 B2 | 3/2011 | Sugiura et al. | |
| 7,939,430 B2 | 5/2011 | Sakamoto et al. | |
| 7,947,574 B2 | 5/2011 | Sakamoto et al. | |
| 2003/0010763 A1 | 1/2003 | Fukuchi et al. | |
| 2005/0202596 A1 | 9/2005 | Fukuyo et al. | |
| 2005/0272223 A1 | 12/2005 | Fujii et al. | |
| 2006/0144828 A1 | 7/2006 | Fukumitsu et al. | |
| 2006/0148212 A1 | 7/2006 | Fukuyo et al. | |
| 2006/0255024 A1 | 11/2006 | Fukuyo et al. | |
| 2007/0085099 A1 | 4/2007 | Fukumitsu et al. | |
| 2007/0125757 A1 | 6/2007 | Fukuyo et al. | |
| 2007/0158314 A1 | 7/2007 | Fukumitsu et al. | |
| 2007/0205185 A1 | 9/2007 | Hiiro | |
| 2007/0252154 A1 | 11/2007 | Uchiyama et al. | |
| 2008/0029497 A1 * | 2/2008 | Eda et al. | 219/121.68 |
| 2008/0035611 A1 | 2/2008 | Kuno et al. | |
| 2008/0037003 A1 | 2/2008 | Atsumi et al. | |
| 2008/0090382 A1 | 4/2008 | Fujii et al. | |
| 2008/0218735 A1 | 9/2008 | Atsumi et al. | |
| 2008/0251506 A1 | 10/2008 | Atsumi et al. | |
| 2009/0008373 A1 | 1/2009 | Muramatsu et al. | |
| 2009/0032509 A1 | 2/2009 | Kuno et al. | |
| 2009/0098713 A1 | 4/2009 | Sakamoto | |
| 2009/0107967 A1 | 4/2009 | Sakamoto et al. | |
| 2009/0117712 A1 | 5/2009 | Sakamoto et al. | |
| 2009/0166342 A1 | 7/2009 | Kuno et al. | |
| 2009/0166808 A1 | 7/2009 | Sakamoto et al. | |
| 2009/0212030 A1 * | 8/2009 | Clifford, Jr. | 219/121.72 |
| 2009/0250446 A1 | 10/2009 | Sakamoto | |
| 2009/0261083 A1 | 10/2009 | Osajima et al. | |
| 2009/0302428 A1 | 12/2009 | Sakamoto et al. | |
| 2010/0006548 A1 | 1/2010 | Atsumi et al. | |
| 2010/0009547 A1 | 1/2010 | Sakamoto | |
| 2010/0012632 A1 | 1/2010 | Sakamoto | |
| 2010/0012633 A1 | 1/2010 | Atsumi et al. | |
| 2010/0015783 A1 | 1/2010 | Fukuyo et al. | |
| 2010/0025386 A1 | 2/2010 | Kuno et al. | |
| 2010/0032418 A1 | 2/2010 | Kuno et al. | |
| 2010/0055876 A1 | 3/2010 | Fukuyo et al. | |
| 2010/0151202 A1 | 6/2010 | Fukumitsu | |
| 2010/0176100 A1 | 7/2010 | Fukuyo et al. | |
| 2010/0184271 A1 | 7/2010 | Sugiura et al. | |
| 2010/0200550 A1 | 8/2010 | Kumagai | |
| 2010/0203678 A1 | 8/2010 | Fukumitsu et al. | |
| 2010/0203707 A1 | 8/2010 | Fujii et al. | |
| 2010/0227453 A1 | 9/2010 | Sakamoto | |
| 2010/0240159 A1 | 9/2010 | Kumagai et al. | |
| 2010/0258539 A1 | 10/2010 | Sakamoto | |
| 2010/0301521 A1 | 12/2010 | Uchiyama | |
| 2010/0311313 A1 | 12/2010 | Uchiyama | |
| 2010/0327416 A1 | 12/2010 | Fukumitsu | |
| 2011/0000897 A1 | 1/2011 | Nakano et al. | |
| 2011/0001220 A1 | 1/2011 | Sugiura et al. | |
| 2011/0021004 A1 | 1/2011 | Fukuyo et al. | |
| 2011/0027971 A1 | 2/2011 | Fukuyo et al. | |
| 2011/0027972 A1 | 2/2011 | Fukuyo et al. | |
| 2011/0037149 A1 | 2/2011 | Fukuyo et al. | |
| 2011/0274128 A1 | 11/2011 | Fukumitsu et al. | |

FOREIGN PATENT DOCUMENTS

| | | |
|---|---|---|
| JP | 2001-198690 | 7/2001 |
| JP | 2002-207202 | 7/2002 |
| JP | 2003-071828 | 3/2003 |
| JP | 2005-316071 | 11/2005 |
| JP | 2006-68762 | 3/2006 |
| JP | 2007-029959 A | 2/2007 |
| JP | 2008-221237 A | 9/2008 |
| WO | WO 2005/106564 | 11/2005 |
| WO | WO 2009/020004 | 2/2009 |

OTHER PUBLICATIONS

U.S. Appl. No. 13/206,181, filed Aug. 9, 2011.
U.S. Appl. No. 13/269,274, filed Oct. 7, 2011.
U.S. Appl. No. 13/235,936, filed Sep. 19, 2011.
U.S. Appl. No. 13/213,175, filed Aug. 19, 2011.
U.S. Appl. No. 13/233,662, filed Sep. 15, 2011.
U.S. Appl. No. 13/061,438, filed Apr. 26, 2011.
U.S. Appl. No. 13/107,056, filed May 13, 2011.
U.S. Appl. No. 13/151,877, filed Jun. 2, 2011.
U.S. Appl. No. 13/143,636, filed Sep. 21, 2011.
U.S. Appl. No. 13/148,097, filed Aug. 26, 2011.
U.S. Appl. No. 13/262,995, filed Oct. 5, 2011.
U.S. Appl. No. 13/265,027, filed Oct. 18, 2011.
X. Liu et al., "Laser Ablation and Micromachining with Ultrashort Laser Pulses," IEEE Journal of Quantum Electronics, vol. 33, No. 10, Oct. 1997, pp. 1706-1716.
K. Hayashi, "Inner Glass Marking by Harmonics of Solid State Laser", Proceedings of $45^{th}$ Laser Materials Processing Conference, Dec. 1998, pp. 23-28.
K. Miura et al., "Formation of Photo-induced Structures in Glasses with Femtosecond Laser, Proceedings of $42^{nd}$ Laser Materials Processing Conference", Nov. 1997, pp. 105-111.
T. Sano et al., Evaluation of Processing Characteristics of Silicon with Picosecond Pulse Laser, Preprints of the National Meeting of Japan Welding Society, No. 66, Apr. 2000, pp. 72-73, including English Translation.

* cited by examiner

LASER MACHINING DEVICE

TECHNICAL FIELD

The present invention relates to a laser machining device for forming a modified region in an object to be machined.

BACKGROUND ART

Known as a conventional laser machining device is one forming a modified region in an object to be machined by irradiating the object with a laser beam while locating a converging point within the object (see, for example, Patent Literatures 1 and 2). Such a laser machining device is designed such that the laser beam emitted from a laser light source is modulated by a reflective spatial light modulator.

CITATION LIST

Patent Literature

Patent Literature 1: International Publication Pamphlet No. 2005/106564
Patent Literature 2: Japanese Patent Application Laid-Open No. 2006-68762

SUMMARY OF INVENTION

Technical Problem

In the above-mentioned laser machining device, the laser beam may not precisely be made incident on the reflective spatial light modulator because of fluctuations among laser light sources and reflective spatial light modulators, for example, whereby aberration may increase in the laser beam converged into the object to be machined.

Therefore, the present invention aims to provide a laser machining device which can suppress the aberration of the laser beam converged into the object to be machined.

Solution to Problem

For solving the problem mentioned above, a laser machining device in accordance with the present invention is a laser machining device for forming a modified region in an object to be machined by irradiating the object with a laser beam while locating a converging point within the object, the laser machining device comprising a laser light source for emitting the laser beam and a reflective spatial light modulator for modulating the laser beam emitted from the laser light source, wherein at least two first mirrors for reflecting the laser beam are disposed between the laser light source and the reflective spatial light modulator in an optical path of the laser beam, while the first mirrors are configured such as to be able to adjust a direction of reflection of the laser beam.

By adjusting the direction of reflection of the laser beam at each of at least two first mirrors, the laser machining device can regulate the position and incident angle of the laser beam incident on the reflective spatial light modulator as desired. Therefore, the laser beam can precisely be made incident on the reflective spatial light modulator. As a result, the reflective spatial light modulator can function favorably, thereby suppressing the aberration of the laser beam converged into the object to be machined.

A laser machining device in accordance with the present invention is a laser machining device for forming a modified region in an object to be machined by irradiating the object with a laser beam while locating a converging point within the object, the laser machining device comprising a laser light source for emitting the laser beam, a reflective spatial light modulator for modulating the laser beam emitted from the laser light source, and an adjustment optical system for adjusting a wavefront form of the laser beam modulated by the reflective spatial light modulator; wherein at least two second mirrors for reflecting the laser beam are disposed between the reflective spatial light modulator and the adjustment optical system in an optical path of the laser beam, while the second mirrors are configured such as to be able to adjust a direction of reflection of the laser beam.

By adjusting the direction of reflection of the laser beam at each of at least two second mirrors, the laser machining device can regulate the position and incident angle of the laser beam incident on the reflective spatial light modulator as desired. Therefore, the laser beam can precisely be made incident on the adjustment optical system. As a result, the adjustment optical system can function favorably, thereby suppressing the aberration of the laser beam converged into the object to be machined.

A laser machining device in accordance with the present invention is a laser machining device for forming a modified region in an object to be machined by irradiating the object with a laser beam while locating a converging point within the object, the laser machining device comprising a laser light source for emitting the laser beam, a reflective spatial light modulator for modulating the laser beam emitted from the laser light source, an adjustment optical system for adjusting a wavefront form of the laser beam modulated by the reflective spatial light modulator, and a condenser optical system for converging the laser beam adjusted by the adjustment optical system into the object; wherein a dichroic mirror transparent to the laser beam is disposed between the adjustment optical system and the condenser optical system in an optical path of the laser beam.

When a divergent or convergent laser beam is incident on a dichroic mirror, astigmatism may occur in the laser beam transmitted through the dichroic mirror. In this regard, the laser machining device of the present invention can regulate the laser beam with the adjustment optical system such that it becomes parallel light, whereby the parallel light can be made incident on the dichroic mirror, thus inhibiting the astigmatism from occurring in the laser beam transmitted through the dichroic mirror.

In this case, the laser machining device may further comprise converging point position control means for locating the converging point at a predetermined position of the object by irradiating the object with a measurement laser beam and receiving reflected light of the measurement laser beam from the object, while the dichroic mirror transmits the laser beam therethrough but reflects the measurement laser beam and the reflected light of the measurement laser beam.

A laser machining device in accordance with the present invention is a laser machining device for forming a modified region in an object to be machined by irradiating the object with a laser beam while locating a converging point within the object, the laser machining device comprising a laser light source for emitting the laser beam, a reflective spatial light modulator for modulating the laser beam emitted from the laser light source, an adjustment optical system for adjusting a wavefront form of the laser beam modulated by the reflective spatial light modulator, a condenser optical system for converging the laser beam adjusted by the adjustment optical system into the object, and converging point position control means for locating the converging point at a predetermined position of the object by irradiating the object with a measurement laser beam and receiving reflected light of the measurement laser beam from the object; wherein, in an optical path of the laser beam, at least two first mirrors for reflecting the laser beam are disposed between the laser light source and the reflective spatial light modulator, at least two second mirrors for reflecting the laser beam are disposed between the reflective spatial light modulator and the adjustment optical system, and a dichroic mirror for transmitting therethrough the laser beam and reflecting the measurement laser beam and the reflected light of the measurement laser beam is disposed between the adjustment optical system and the condenser optical system.

In this laser machining device, the laser beam can precisely be made incident on the reflective spatial light modulator and adjustment optical system, so that the reflective spatial light modulator and adjustment optical system can function favorably, whereby the aberration of the laser beam converged into the object to be machined can further be suppressed. In addition, the astigmatism can be inhibited from occurring in the laser beam transmitted through the dichroic mirror.

Preferably, the adjustment optical system is an optical system configured such that first and second lenses have the same focal point therebetween. An example of such an adjustment optical system is a 4f optical system.

Preferably, the reflective spatial light modulator modulates the laser beam such that the laser beam converged into the object has aberration at a predetermined level or less. This can enhance the energy density of the laser beam at the converging position of the laser beam, so as to form a modified region having a higher function as a cutting start point (e.g., which is easier to generate a fracture).

Preferably, a beam expander or beam homogenizer is disposed between the mirror located most downstream in the mirrors and the reflective spatial light modulator in the optical path of the laser beam. In this case, the laser beam can precisely be made incident on the optical center of the beam expander or beam homogenizer (the optical center of a lens), whereby a function of the beam expander to expand the beam diameter of the laser beam or a function of the beam homogenizer to homogenize the intensity distribution of the laser beam can fully be exhibited.

Advantageous Effects of Invention

The present invention can suppress the aberration of the laser beam converged into the object to be machined.

DESCRIPTION OF EMBODIMENTS

Figure 1:
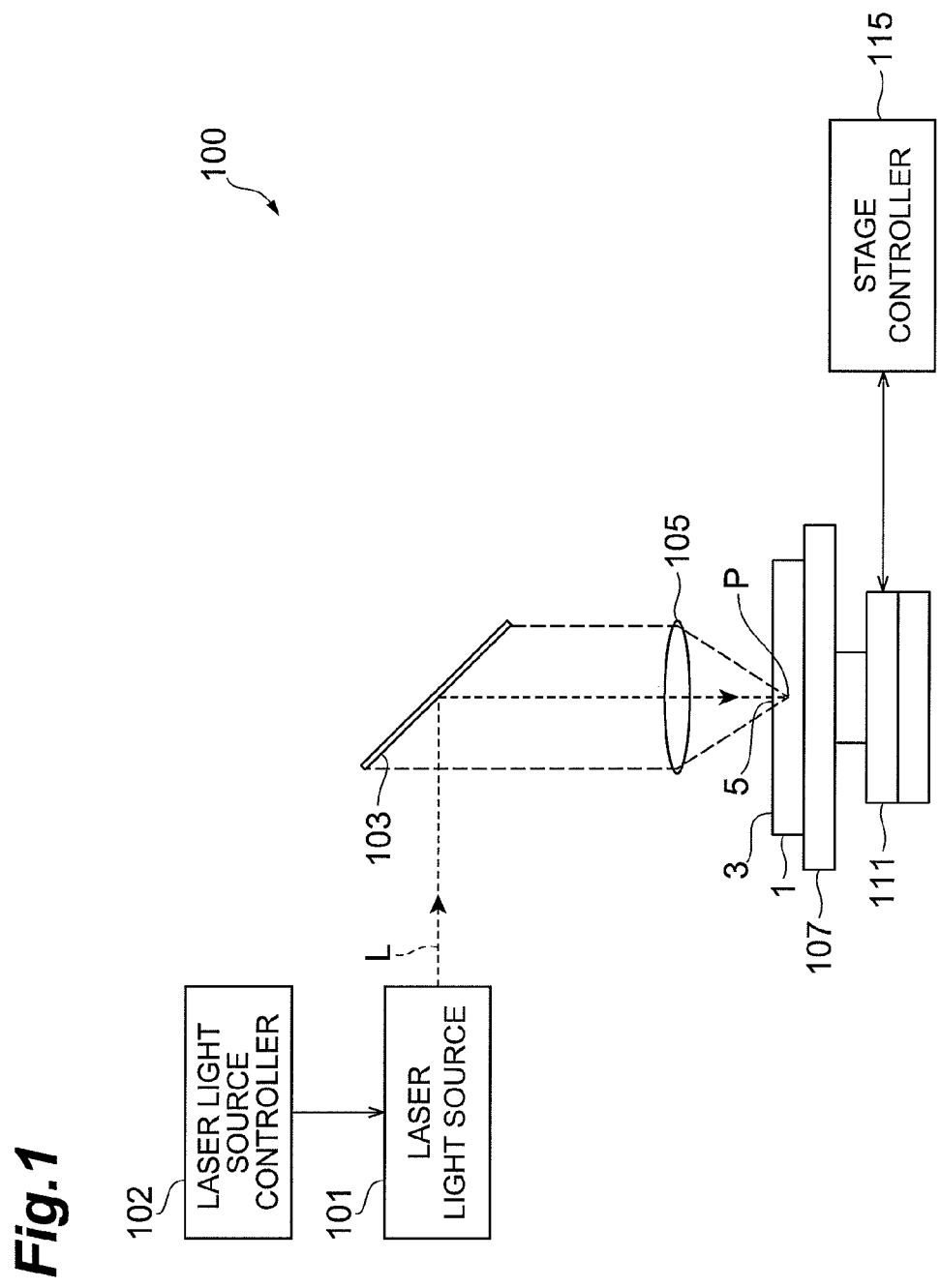
FIG. 1 is a schematic structural diagram of a laser machining device used for forming a modified region.
Figure 2:
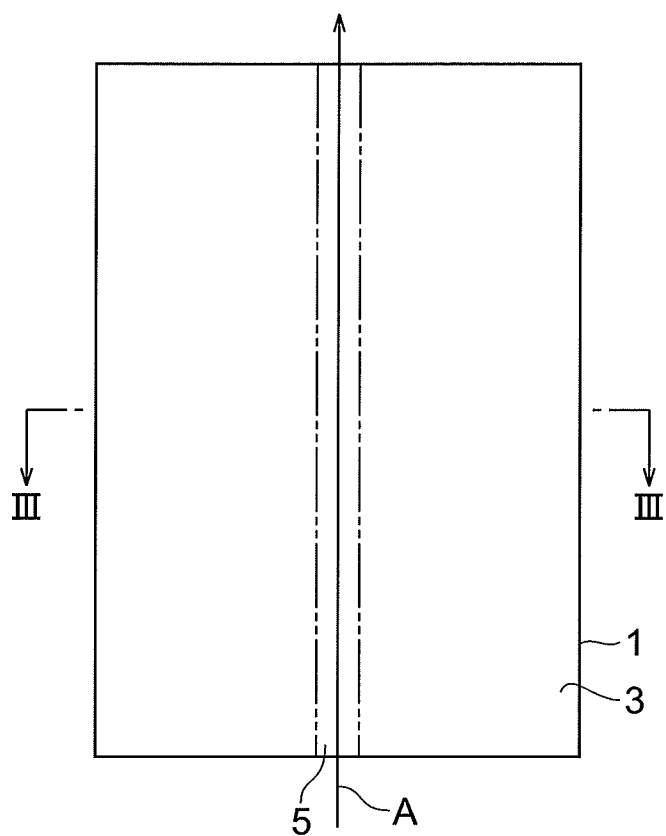
FIG. 2 is a plan view of an object to be machined in which the modified region is to be formed.

In the following, preferred embodiments of the present invention will be explained in detail with reference to the drawings. In the drawings, the same or equivalent parts will be referred to with the same signs while omitting their overlapping descriptions. Terms "upper", "lower", "left", and "right" are based on the states illustrated in the drawings and used only for convenience.

The laser machining device in accordance with an embodiment forms a modified region in an object to be machined by irradiating the object with a laser beam while locating a converging point within the object. Therefore, the forming of the modified region by the laser machining device in accordance with this embodiment will be explained first with reference to FIGS. 1 to 6.

As illustrated in FIG. 1, a laser machining device 100 comprises a laser light source 101 for pulsatingly oscillating a laser beam L, a dichroic mirror 103 arranged such as to change the direction of the optical axis (optical path) of the laser beam L by 90°, and a condenser lens (condenser optical system) 105 for converging the laser beam L. The laser machining device 100 further comprises a mount table 107 for mounting an object to be machined 1 which is irradiated with the laser beam L converged by the condenser lens 105; a stage 111 for moving the support table 107 along X, Y, and Z axes; a laser light source controller 102 for regulating the laser light source 101 in order to adjust the output, pulse width, and the like of the laser beam L; and a stage controller 115 for regulating movements of the stage 111.

In the laser machining device 100, the laser beam L emitted from the laser light source 101 changes the direction of its optical axis by 90° at the dichroic mirror 103, and then is converged by the condenser lens 105 into the object 1 on the mount table 107. At the same time, the stage 111 is shifted, so that the object 1 is moved relative to the laser beam L along a line to cut 5. As a consequence, a modified region is formed in the object 1 along the line to cut 5.

Figure 3:
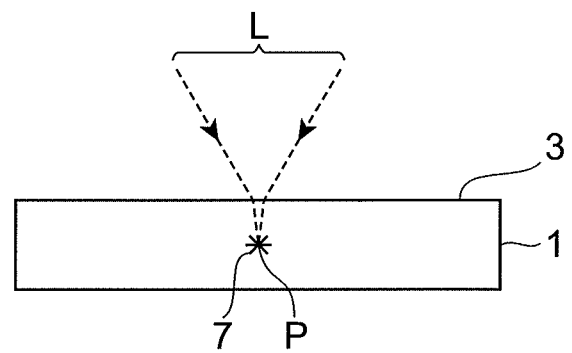
FIG. 3 is a sectional view of the object taken along the line III-III of FIG. 2.
Figure 4:
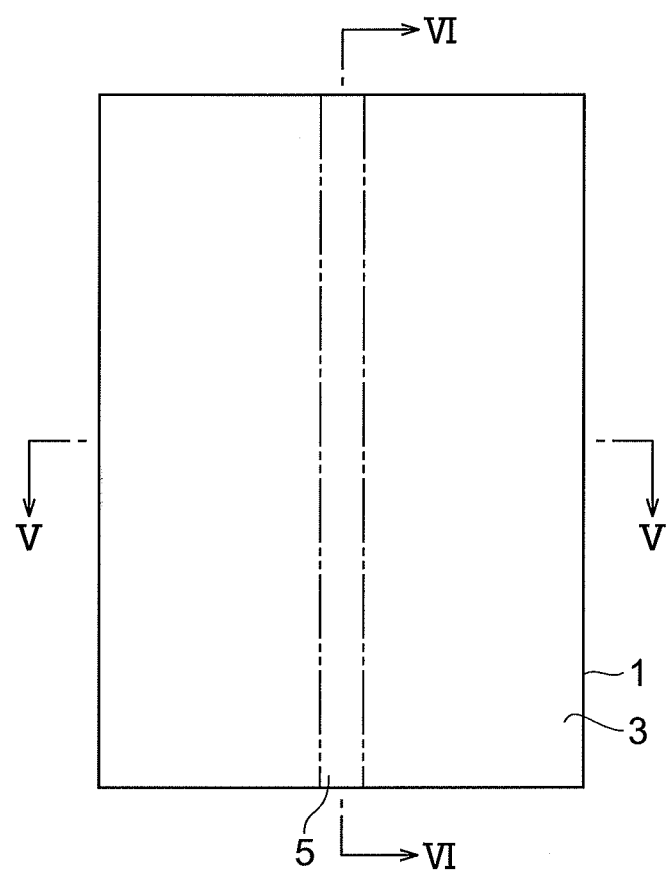
FIG. 4 is a plan view of the object after laser machining.
Figure 5:
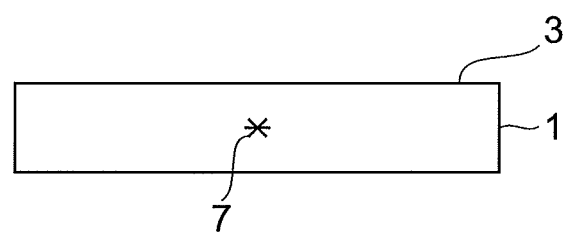
FIG. 5 is a sectional view of the object taken along the line V-V of FIG. 4.
Figure 6:
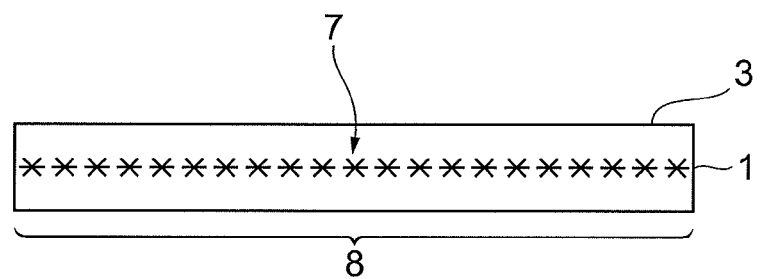
FIG. 6 is a sectional view of the object taken along the line VI-VI of FIG. 4.

The object to be machined 1, for which a semiconductor material, a piezoelectric material, or the like is used, has the line to cut 5 set therein for cutting the object 1. The line to cut 5 is a virtual line extending straight. When forming a modified region within the object 1, the laser beam L is relatively moved along the line to cut 5 (i.e., in the direction of arrow A in FIG. 2) while locating a converging point P within the object 1 as illustrated in FIG. 3. Consequently, as illustrated in FIGS. 4 to 6, a modified region 7 is formed within the object 1 along the line to cut 5, and the modified region 7 formed along the line to cut 5 becomes a cutting start region 8.

The converging point P is a position at which the laser beam L is converged. The line to cut 5 may be curved instead of being straight, and may be a line actually drawn on the front face 3 of the object 1 without being restricted to the virtual line. The modified region 7 may be formed either continuously or intermittently. The modified region 7 may also be formed like dots or rows. It is only necessary that the modified region 7 be formed at least within the object 1. There are cases where fissures are formed from the modified region 7 acting as a start point, and the fissures and modified region 7 may be exposed at outer surfaces (the front face, rear face, and outer peripheral face) of the object 1.

Here, the laser beam L is absorbed in particular in the vicinity of the converging point within the object 1 while being transmitted therethrough, whereby the modified region 7 is formed in the object 1 (i.e., internal absorption type laser machining). Therefore, the front face 3 of the object 1 hardly absorbs the laser light L and thus does not melt. In the case of forming a removing part such as a hole or groove by melting it away from the front face 3 (i.e., surface absorption type laser machining), the machining region gradually progresses from the front face 3 side to the rear face side in general.

The modified region formed by the laser machining device in accordance with this embodiment means regions whose physical characteristics such as density, refractive index, and mechanical strength have attained states different from those of their surroundings. Examples of the modified region include molten processed regions, crack regions, dielectric breakdown regions, refractive index changed regions, and their mixed regions. Other examples of the modified region include modified regions whose density has changed from that of unmodified regions in the material of the object and those formed with lattice defects (also collectively referred to as a high-density transition region).

There are also cases where the molten processed regions, refractive index changed regions, modified regions whose density has changed from that of unmodified regions, and regions formed with lattice defects further incorporate fissures (fractures or microcracks) therewithin or at interfaces between the modified and unmodified regions. The incorporated fissures may extend over the whole surface of the modified region or be formed in only a part or plurality of parts thereof. Examples of the object 1 include those containing or constituted by silicon, glass, LiTaO$_3$, or sapphire (Al$_2$O$_3$).

First Embodiment

The laser machining device in accordance with the first embodiment will now be explained.

Figure 7:
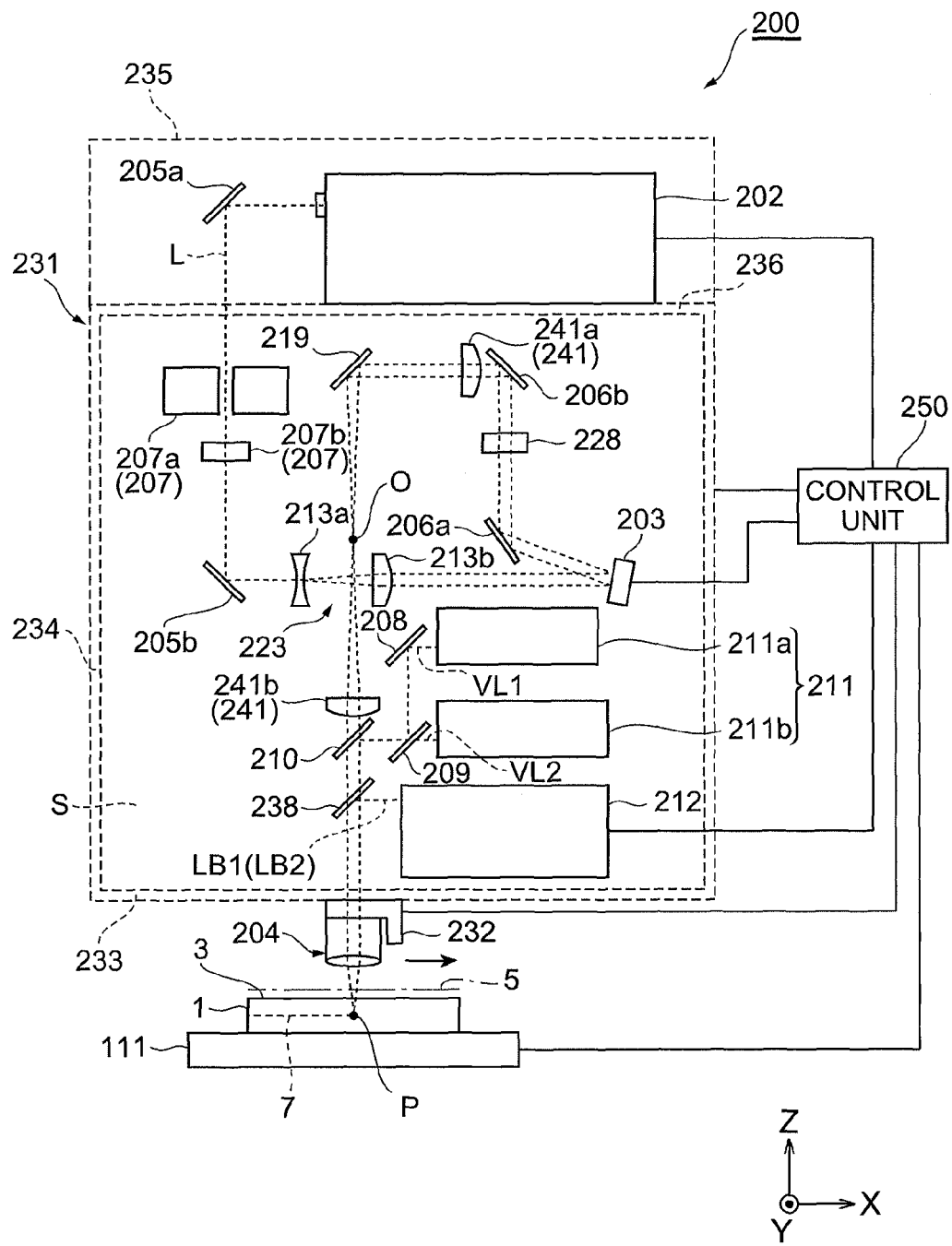
FIG. 7 is a schematic structural diagram of the laser machining device in accordance with a first embodiment.

FIG. 7 is a schematic structural diagram illustrating the laser machining device in accordance with the first embodiment. As illustrated in FIG. 7, a laser machining device 200 irradiates the object 1 on the stage 111 with the laser beam L while locating the converging point P within the object 1, so as to form the modified region 7 to become a cutting start point along the line to cut 5 of the object 1. The laser machining device 200 comprises a laser light source 202, a reflective spatial light modulator 203, a 4f optical system 241, and a condenser optical system 204 within a housing 231.

The laser light source 202, for which a fiber laser is used, for example, emits the laser beam L. The laser light source 202 used here is secured to a top plate 236 of the housing 231 with screws or the like (in a so-called transversely mounted state) such as to emit the laser beam horizontally (in the X direction)

The reflective spatial light modulator 203 modulates the laser beam L emitted from the laser light source 202, for which a spatial light modulator (SLM) of a liquid crystal on silicon (LCOS) is used, for example. The reflective spatial light modulator 203 modulates the horizontally incident laser beam L such that the aberration of the laser beam converged into the object 1 (i.e., the laser beam L at the converging position) is at a predetermined level or less, while reflecting it obliquely upward with respect to the horizontal direction. In other words, the horizontally incident laser beam L is modulated such that the wavefront of the laser beam L becomes a predetermined wavefront within the object 1, while being reflected obliquely upward with respect to the horizontal direction.

Here, "aberration at a predetermined level or less" means that the aberration of the laser beam L occurring at the converging position is made smaller than that generated when converged without the aid of the spatial light modulator 203, for example. It ideally means that the aberration of the laser beam L occurring at the converging position of the laser beam L becomes substantially zero.

Figure 8:
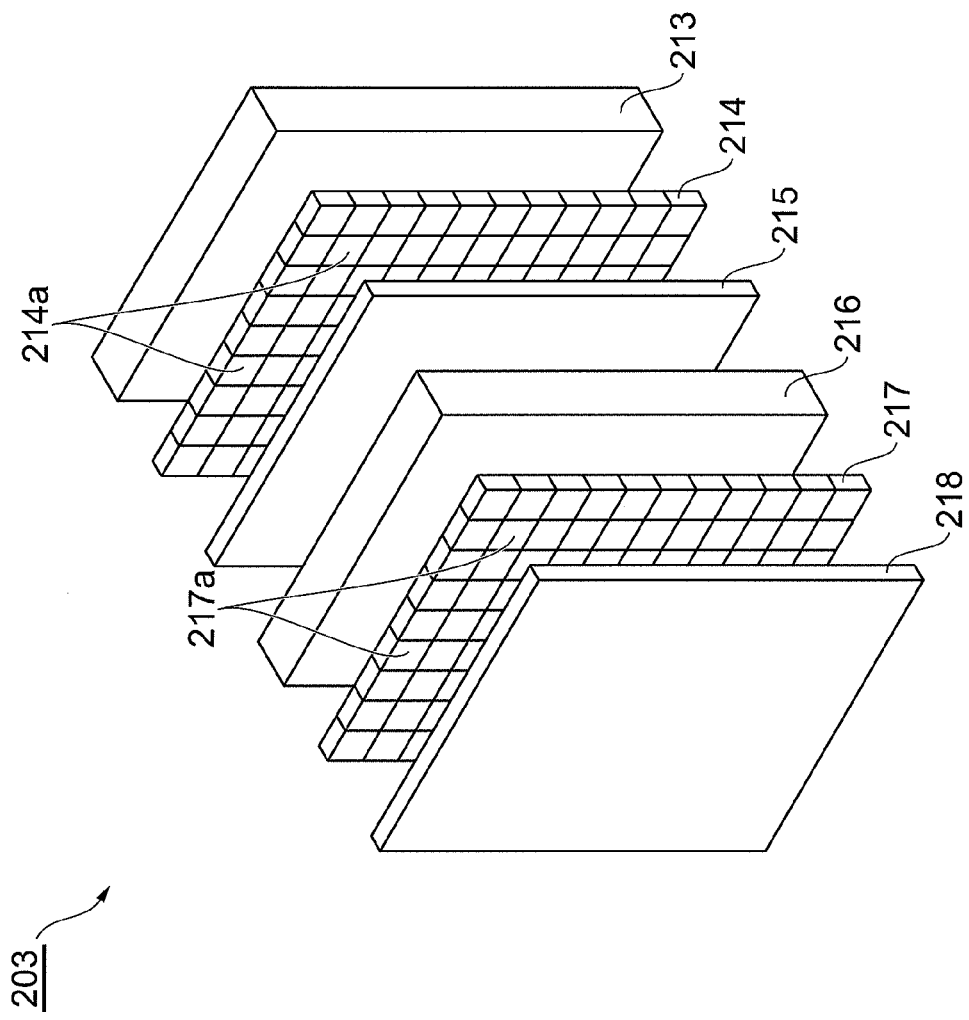
FIG. 8 is an exploded perspective view of a reflective spatial light modulator in the laser machining device of FIG. 7.

FIG. 8 is an exploded perspective view of the reflective spatial light modulator in the laser machining device of FIG. 7. As illustrated in FIG. 8, the reflective spatial light modulator 203 comprises a silicon substrate 213, a metal electrode layer 214 disposed on the silicon substrate 213, a mirror layer 215 disposed on the metal electrode layer 214, a liquid crystal layer 216 disposed on the mirror layer 215, a transparent electrode layer 217 disposed on the liquid crystal layer 216, and a glass sheet 218 disposed on the transparent electrode layer 217.

The metal electrode layer 214 and transparent electrode layer 217 have a plurality of electrode units 214a, 217a arranged into matrixes, while the electrode units 214a of the metal electrode layer 214 and the electrode units 217a of the transparent electrode layer 217 oppose each other in the laminating direction of the reflective spatial light modulator 203.

The laser beam L from the outside of the reflective spatial light modulator 203 passes through the glass sheet 218 and transparent electrode layer 217 in sequence, so as to impinge on the liquid crystal layer 216, and then is reflected by the mirror layer 215, so as to pass through the liquid crystal layer 216, transparent electrode layer 217, and glass sheet 218 in sequence, thereby exiting to the outside. At this time, a voltage is applied to each pair of electrode units 214a, 217a opposing each other, so that the refractive index of the part held between the pair of electrode units 214a, 217a opposing each other in the liquid crystal layer 216 changes according to the voltage. This causes a phase shift in a component of a predetermined direction orthogonal to the advancing direction of each of a plurality of rays constituting the laser beam L, whereby the laser beam L is shaped (phase-modulated).

Returning to FIG. 7, the 4f optical system 241 adjusts the wavefront form of the laser beam L modulated by the reflective spatial light modulator 203. The 4f optical system 241 has a first lens 241a and a second lens 241b.

The lenses 241a, 241b are arranged between the reflective spatial light modulator 203 and condenser optical system 204 such that the distance between the reflective spatial light modulator 203 and the first lens 241a becomes the focal length f1 of the first lens 241a, the distance between the condenser optical system 204 and lens 241b becomes the focal length f2 of the second lens 241b, the distance between the first and second lenses 241a, 241b becomes f1+f2, and the first and second lenses 241a, 241b constitute a double telecentric optical system.

In the 4f optical system 241, the laser beam L, phase-modulated by the reflective spatial light modulator 203, having a predetermined beam diameter and such a wavefront that the aberration of the converged laser beam L is at a predetermined level or less can be converged by the condenser optical system 204. The ratio between the focal lengths f1 and f2 is n:1 (where n is a real number), whereby the beam diameter and wavefront of the laser beam L incident on the condenser optical system 204 becomes 1/n and n times those when reflected by the reflective spatial light modulator 203, respectively. The 4f optical system 241 can also inhibit the laser beam L modulated (corrected) by the reflective spatial light modulator 203 from changing its wavefront form and enhancing the aberration when propagating through a space. The 4f optical system 241 herein regulates the laser beam L such that the laser beam L incident on the condenser optical system 204 becomes parallel light.

The condenser optical system 204 converges the laser beam L modulated by the 4f optical system 241 into the object 1. The condenser optical system 204 includes a plurality of lenses and is attached to a bottom plate 233 of the housing 231 through a drive unit 232 including a piezoelectric element or the like.

The outer form of the housing 231, which is in such a simple form as to reduce its distortions, is a substantially rectangular parallelepiped here. In the housing 231, both side plates 234, the bottom plate 233, the top plate 236, and a back plate (a wall plate on the back side) are formed thick, while an upper lid 235 above the top plate 236 and a front plate (a wall plate on the front side) are formed thinner than the former plates.

The laser machining device 200 also includes a surface observation unit 211 and an AF (AutoFocus) unit (converging point control means) 212 within the housing 231. The surface observation unit 211 is used for observing the front face 3 of the object 1. The surface observation unit 211 has, at least, an observation light source 211a for emitting visible light VL1, a detector 211b for receiving and detecting reflected light VL2 of the visible light VL1 reflected by the front face 3 of the object 1, and a dichroic mirror 210 for transmitting therethrough the laser beam L and reflecting the visible light VL1 and reflected light VL2. The dichroic mirror 210 is disposed between the 4f optical system 241 and condenser optical system 204 in the optical path of the laser beam L, while being arranged such as to change the direction of the visible light VL1 and reflected light VL2 by 90°.

In the surface observation unit 211, the visible light VL1 emitted from the observation light source 211a is reflected by the mirror 208 and dichroic mirrors 209, 210 in sequence, so as to be converged by the condenser optical system 204. The reflected light VL2 reflected by the front face 3 of the object 1 is converged by the condenser optical system 204, reflected by the dichroic mirror 210, and transmitted through the dichroic mirror 209.

The AF unit 212 is used for precisely positioning the converging point P of the laser beam L at a predetermined distance from the front face 3 of the object 1 even when undulations exist on the front face 3, for example. Specifically, the AF unit 212 emits an AF laser beam LB1 to the object 1 and receives and detects a reflected beam LB2 of the AF laser beam LB1, thereby acquiring displacement data of the front face 3 along the line to cut 5. When forming the modified region 7, the drive unit 232 is driven according to the acquired displacement data, so as to move the condenser optical system 204 back and forth along its optical axis to follow the undulations of the front face 3 of the object 1, thereby finely adjusting the distance between the condenser optical system 204 and the object 1.

The AF unit 212 has at least an AF dichroic mirror 238 for transmitting therethrough the laser beam L and reflecting the AF laser beam LB1 and reflected beam LB2. The AF dichroic mirror 238 is disposed downstream of the dichroic mirror 210 between the 4f optical system 241 and condenser optical system 204 in the optical path of the laser beam L, while being arranged such as to change the direction of the AF laser beam LB1 and reflected beam LB2 by 90°. The AF dichroic mirror 238 is a transmissive optical element disposed on the most downstream side of the optical path of the laser beam L. That is, the AF unit 212 is configured such that the reflected beam LB2 is prevented from passing through other transmissive optical elements such as other dichroic mirrors.

The incident angle and direction of the AF laser beam LB1 at the AF dichroic mirror 238 are the same as those of the visible light VL1 at the dichroic mirror 210. That is, the dichroic mirrors 210, 238 are disposed such that their mirror surfaces tilt by the same angle in the same direction with respect to the optical axis of the laser beam L. As a consequence, the surface observation unit 211 and AF unit 212 are arranged on the same side (the right side in the drawing) within the housing 231.

The laser machining device 200 is equipped with a control unit 250, which is connected to the laser light source 202, reflective spatial light modulator 203, stage 111, housing 231, and AF unit 212 so as to regulate them, for controlling the laser machining device 200 as a whole. Specifically, the control unit 250 carries out the following control.

The control unit 250 controls the laser light source 202, so as to regulate the output, pulse width, and the like of the laser beam L emitted from the laser light source 202. The control unit 250 also controls at least one of the housing 231 and stage 111 such that the converging point P of the laser beam L is positioned at a predetermined distance from the front face 3 of the object 1 and relatively moves along the line to cut 5 when forming the modified region 7.

The control unit 250 controls the reflective spatial light modulator 203 such that the laser beam L attains a predetermined optical characteristic. For example, when forming the modified region 7, it controls the reflective spatial light modulator 203 by applying a predetermined voltage between each pair of electrode units 214a, 217a opposing each other such that the aberration of the laser beam converged into the object 1 is at a predetermined level or less. More specifically, the control unit 250 feeds wavefront shaping (aberration correcting) pattern information for shaping (modulating) the beam pattern (beam wavefront) of the laser beam L incident on the reflective spatial light modulator 203 into the reflective spatial light modulator 203. Then, a signal based on the input pattern information changes the refractive index of the liquid crystal layer 216 corresponding to each pair of the electrodes 214a, 217a, thereby shaping (modulating) the beam pattern (beam wavefront) of the laser beam L emitted (reflected) from the reflective spatial light modulator 203.

The control unit 250 may be disposed on the outside of the housing 231 as illustrated or therewithin. The control unit 250 may feed the pattern information sequentially into the reflective spatial light modulator 203 or pre-stored pattern information selectively thereinto.

Here, the laser machining device in accordance with this embodiment comprises a pair of first mirrors 205a, 205b disposed between the laser light source 202 and reflective spatial light modulator 203 and a pair of second mirrors 206a, 206b disposed between the reflective spatial light modulator 203 and 4f optical system 241 in the optical path of the laser beam L.

To the reflective spatial light modulator 203, the first mirrors 205a, 205b reflect the laser beam L emitted by the laser light source 202. The first mirrors 205a, 205b are arranged such as to change the direction of the laser beam L by 90° each. Specifically, the first mirror 205a on the upstream side reflects downward the laser beam L incident thereon from the horizontally right side, while the first mirror 205b on the downstream side reflects horizontally rightward the laser beam L incident thereon from thereabove.

To the 4f optical system 241, the second mirrors 206a, 206b reflect the laser beam L reflected by the reflective spatial light modulator 203. Specifically, the second mirror 206a on the upstream side reflects upward the laser beam L incident thereon from obliquely thereunder with respect to the horizontal direction, while the second mirror 206b on the downstream side reflects horizontally leftward the laser beam L incident thereon from thereunder.

Each of the mirrors 205a, 205b, 206a, 206b has an axis extending in a predetermined direction (along the Y axis here) and is configured such as to be rotatable about this axis. As a consequence, the mirrors 205a, 205b, 206a, 206b are constructed such that their reflecting directions (reflecting angles) are adjustable. Therefore, the reflecting directions of the first mirrors 205a, 205b are appropriately adjusted so as to regulate the position and incident angle of the laser beam L such that the laser beam L is reliably made incident on the reflective spatial light modulator 203 at a predetermined incident angle. The reflecting directions of the second mirrors 206a, 206b are appropriately adjusted so as to regulate the position and incident angle of the laser beam L such that the laser beam L is reliably made incident on the 4f optical system 241 at a predetermined incident angle.

The mirrors 205a, 205b, 206a, 206b may be configured such that their reflecting directions are adjusted by electric means such as piezoelectric elements or mechanical means such as screws.

In the optical path of the laser beam L, a beam expander 223 is disposed between the first mirror 205b on the downstream side and the reflective spatial light modulator 203. The beam expander 223 is used for expanding the beam diameter of the laser beam L and has a concave lens 213a and a plano-convex lens 213b. The plano-convex lens 213b is detachable and installable at a plurality of positions on the optical path of the laser beam L such that the distance between the lenses 213a, 213b is variable. Hence, installing the plano-convex lens 213b at a desirable position can expand the beam diameter of the laser beam L as desired.

For suppressing the aberration of the laser beam L transmitted through the beam expander 223, the respective focal lengths of the concave lens 213a and plano-convex lens 213b are set longer as listed in the following, for example.

Focal length of the concave lens 213a: focal length of the plano-convex lens $213b = -10 : +20 = -20 : +40 = -30 : +60$ An attenuator 207 is disposed between the first mirrors 205a, 205b in the optical path of the laser beam L. The attenuator 207 is used for adjusting the optical intensity of the laser beam L. The attenuator 207 includes a polarizing plate 207a for obtaining linearly polarized light and a half-wave plate 207b for changing the direction of polarization.

A half-wave plate 228 for changing the direction of polarization is disposed between the second mirrors 206a, 206b in the optical path of the laser beam L. The half-wave plate 228 makes it possible for the polarization direction of the laser beam L to correspond to the direction in which the machining progresses (a direction along the line to cut 5).

First, when cutting the object 1 by using thus configured laser machining device 100, the object 1 having an expandable tape attached to the rear face thereof, for example, is mounted on the stage 111. Subsequently, the object 1 is irradiated with the laser beam L from the front face 3 side while locating the converging point within a silicon wafer 11, so as to form the modified region 7 within the object 1 along the line to cut 5. Then, the expandable tape is expanded. As a consequence, the object 1 is precisely cut along the line to cut 5 from the modified region 7 acting as a cutting start point, whereby a plurality of semiconductor chips are separated from each other.

Here, the laser beam L emitted from the laser light source 202 advances horizontally within the housing 231 and then is reflected downward by the first mirror 205a, so that its optical intensity is adjusted by the attenuator 207. Thereafter, the laser beam L is horizontally reflected by the first mirror 205b and, with its beam diameter expanded by the beam expander 223, enters the reflective spatial light modulator 203.

The laser beam L having entered the reflective spatial light modulator 203 is modulated (corrected) such that the aberration of the laser beam L converged into the object 1 by the reflective spatial light modulator 203 is at a predetermined level or less, and then is emitted obliquely upward with respect to the horizontal direction. Thereafter, the laser beam L is reflected upward by the second mirror 206a and then, with its polarization direction changed by the half-wave plate 228, horizontally by the second mirror 206b, so as to enter the 4f optical system 241.

The wavefront form of the laser beam L having entered the 4f optical system 241 is adjusted such that the laser beam L incident on the condenser optical system 204 becomes parallel light. Specifically, the laser beam L is transmitted through and converged by the first lens 241a and reflected downward by the mirror 219. The laser beam L diverges through a confocal point O, intersects the optical path between the first mirror 205b and reflective spatial light modulator 203, passes through the second lens 241b, and then converges again so as to become parallel light.

Thereafter, the laser beam L passes through the dichroic mirrors 210, 238 in sequence, so as to enter the condenser optical system 204, and is converged by the condenser optical system 204 into the object 1 mounted on the stage 111.

As in the foregoing, the first mirrors 205a, 205b having variable reflecting directions for the laser beam L are disposed between the laser light source 202 and reflective spatial light modulator 203. The reflecting directions of the first mirrors 205a, 205b for the laser beam L are appropriately regulated so as to adjust the position and incident angle of the laser beam L such that the laser beam L is reliably made incident on the reflective spatial light modulator 203 at a predetermined incident angle. As a consequence, the laser beam L can precisely be made incident on the reflective spatial light modulator 203, so that the reflective spatial light modulator 203 can function favorably, whereby the aberration of the laser beam L converged into the object 1 can be suppressed (reduced).

As mentioned above, the aberration of the laser beam L occurring at the converging position of the laser beam L is at a predetermined level or less (ideally substantially zero) in this embodiment. This can enhance the energy density of the laser beam L at the converging position and thus can form the modified region 7 having a higher function as a cutting start point (e.g., easier to generate a fissure). That is, the laser beam L can selectively be converged on a small area within the object 1, so as to increase the temperature difference from its surroundings, which makes it possible to generate a large stress near this small area, thereby enhancing the fissure contributing to cutting.

Since the beam expander 223 is disposed between the first mirror 205b and reflective spatial light modulator 203 in the optical path of the laser beam L as mentioned above, the corrected laser beam L can be made incident on the beam expander 223 in this embodiment. Hence, the beam expander 223 can fully exhibit its function of expanding the beam diameter of the laser beam L.

As mentioned above, the second mirrors 206a, 206b with variable reflecting directions for the laser beam L are disposed between the reflective spatial light modulator 203 and 4f optical system 241 in the laser machining device 200 in accordance with this embodiment. The reflecting directions of the second mirrors 206a, 206b for the laser beam L are appropriately regulated so as to adjust the position and incident angle of the laser beam L such that the laser beam L is reliably made incident on the 4f optical system 241 at a predetermined incident angle. Therefore, the laser beam L can precisely be made incident on the 4f optical system 241, so that the 4f optical system 241 can function favorably, whereby the aberration of the laser beam L converged into the object 1 can be suppressed.

In the dichroic mirrors 210, 238, when their mirror surfaces do not intersect the optical axis of the laser beam L at right angles in particular, astigmatism may occur (the wavefront may be distorted) in the laser beam L transmitted therethrough if it is diverged or converged. In this regard, since the dichroic mirrors 210, 238 are disposed between the 4f optical system 241 and condenser optical system 204 in the optical path of the laser beam L as mentioned above, the laser beam L adjusted such as to become parallel light in the 4f optical system 241 is made incident on the dichroic mirrors 210, 238 in this embodiment. This can inhibit astigmatism from occurring in the laser beam L converged into the object 1.

Since the attenuator 207 is disposed upstream of the beam expander 223 in the optical path of the laser beam L as mentioned above, the beam diameter of the laser beam L becomes smaller in the attenuator 207 in this embodiment. Therefore, optical elements such as the polarizing plate 207a and half-wave plate 207b in the attenuator 207 can be made smaller.

In this embodiment, the laser light source 202 is mounted transversely in the housing 231 as mentioned above and thus can easily be replaced.

As mentioned above, the AF unit 212 is configured such that the AF laser beam LB1 and reflected beam LB2 do not pass through other transmissive optical elements such as dichroic mirrors in this embodiment. Therefore, the AF unit 212 can precisely detect the reflected beam LB2 and thus can finely adjust the distance between the condenser optical system 204 and object 1 with a high precision.

In order for the second mirrors 206a, 206b to achieve the above-mentioned effect of making the laser beam L precisely incident on the 4f optical system 241, it is necessary for the first lens 241a to be disposed downstream of the second mirror 206b. In this regard, since the reflective spatial light modulator 203 reflects the laser beam L obliquely upward with respect to the horizontal direction, the present invention makes it easier to dispose the first lens 241a downstream of the second mirror 206b while setting the distance between the first lens 241a and reflective spatial light modulator 203 at the focal length f1.

Since the optical path of the laser beam L is located on the X-Z plane (on one plane) and does not advance in the Y direction (direction perpendicular to the paper surface), the mirrors 205a, 205b, 206a, 206b can easily be adjusted in this embodiment. That is, when adjusting the reflecting directions of the mirrors 205a, 205b, 206a, 206b, for example, it will be sufficient if only their rotational directions about the Y axis are regulated.

In this embodiment, the reflective spatial light modulator 203, surface observation unit 211, and AF unit 212 are disposed on one side of the horizontal direction (on the right side in the drawing) within the housing 231. Therefore, leads connected to them can be arranged compactly. Further, in this case, a space S can be formed on the other side of the horizontal direction (on the left side in the drawing) within the housing 231, whereby an inner light source for observing the inside of the object 1 can be disposed in the space S, for example.

The incident angle (hereinafter referred to as "NA") of the laser beam L converged into the object 1 may change depending on the pattern information fed from the control unit 250 to the reflective spatial light modulator 203 in order to carry out phase modulation. This change is small in amount but may become problematic when forming the precise modified region 7. When the NA is smaller than a predetermined NA, for example, the modified region 7 having a higher function as a cutting start point may be harder to form. Hence, in this embodiment, the control unit 250 controls the phase modulation of the laser beam L such that the NA is kept within a predetermined range for forming the favorable modified region 7.

Even when the NA is kept within a predetermined range, the machining position (converging position) may vary if the NA is changed by the phase modulation. Therefore, under the control of the control unit 250, the aberration of the laser beam L converged into the object 1 is corrected, and the distance between the condenser optical system 204 and the object 1 is adjusted such as to keep a predetermined machining position in this embodiment.

There is a case where the amount of phase modulation in the reflective spatial light modulator 203 is restricted by its pixel structure. Therefore, in order to precisely reproduce the wavefront for fully correcting the aberration, the control unit 250 of this embodiment adjusts the distance between the condenser optical system 204 and object 1 according to the amount of phase modulation so as to reduce the amount of phase modulation.

Second Embodiment

Figure 9:
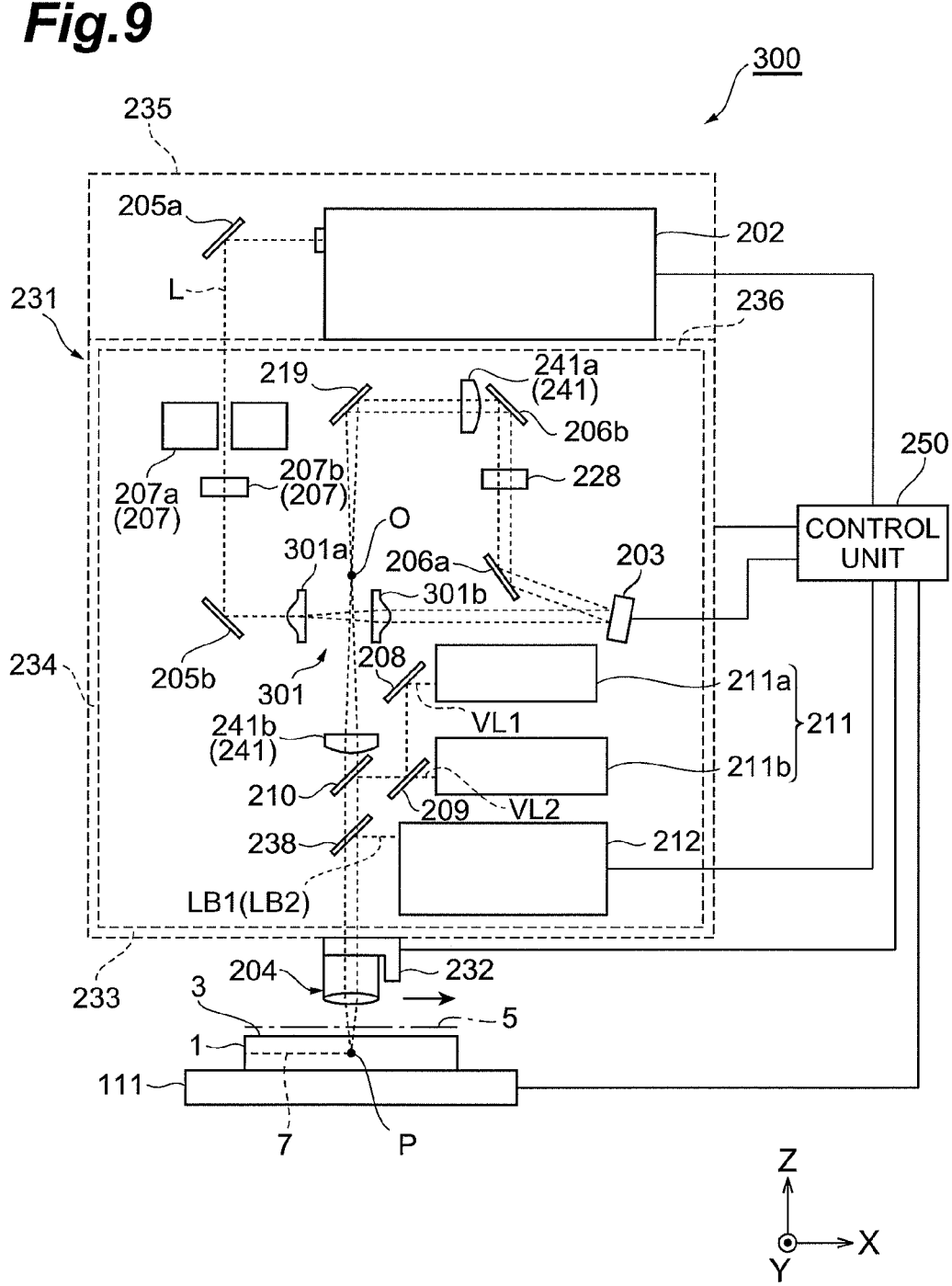
FIG. 9 is a schematic structural diagram of the laser machining device in accordance with a second embodiment.

The laser machining device in accordance with the second embodiment will now be explained. FIG. 9 is a schematic structural view illustrating the laser machining device in accordance with the second embodiment of the present invention. As illustrated in FIG. 9, the laser machining device 300 in accordance with this embodiment differs from that of the above-mentioned first embodiment in that it is equipped with a beam homogenizer 301 in place of the beam expander 223 (see FIG. 7).

The beam homogenizer 301 is used for homogenizing the intensity distribution of the laser beam L and has aspherical lenses 301a, 301b. The beam homogenizer 301 is disposed between the first mirror 205b and reflective spatial light modulator 203 in the optical path of the laser beam L.

This embodiment exhibits an effect similar to that mentioned above, i.e., the effect of suppressing the aberration of the laser beam L converged into the object 1. This embodiment also makes it possible for the beam homogenizer 301 to homogenize the intensity distribution of the laser beam L having a Gaussian distribution, so as to form the modified region 7 precisely.

Third Embodiment

Figure 10:
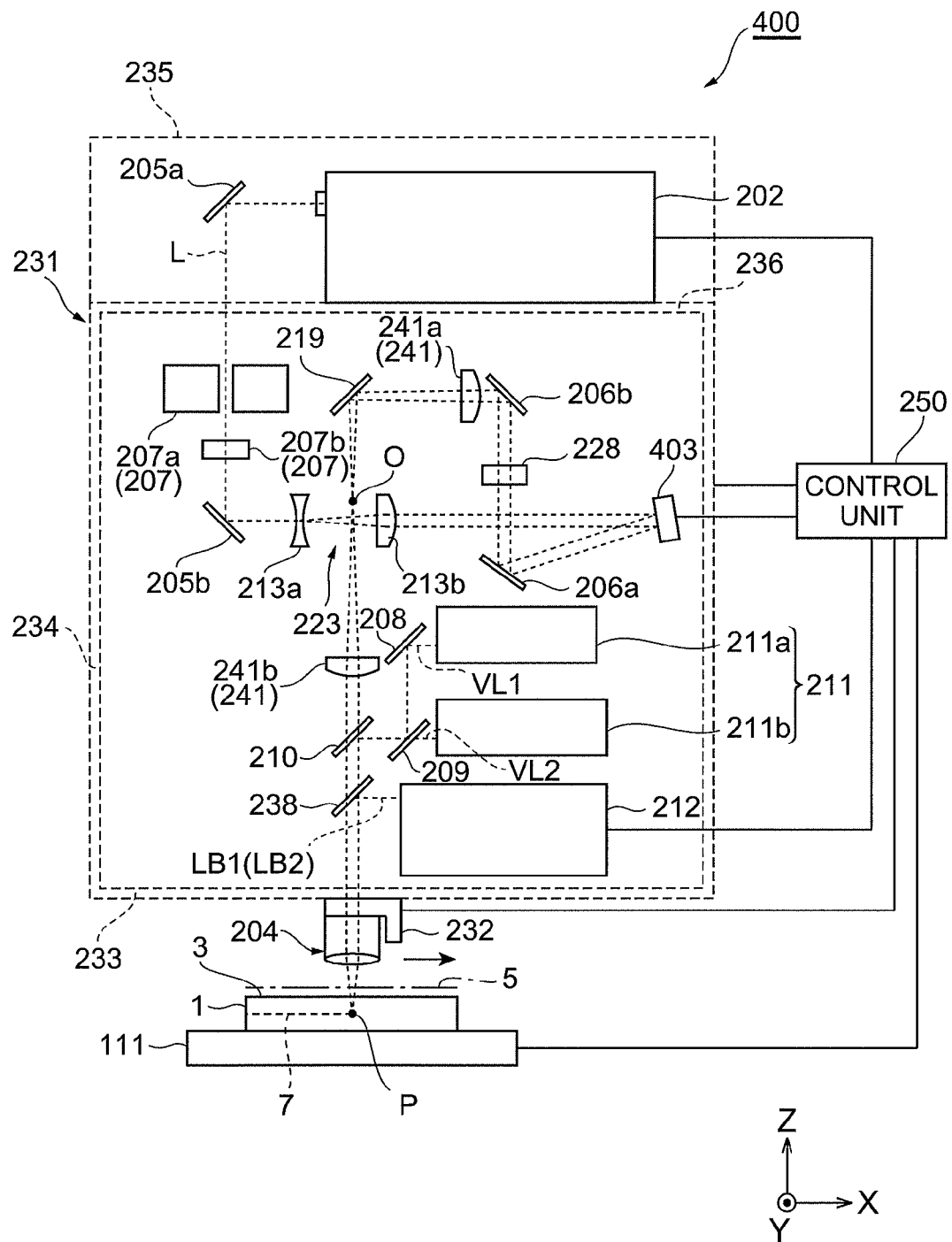
FIG. 10 is a schematic structural diagram of the laser machining device in accordance with a third embodiment.

The laser machining device in accordance with the third embodiment will now be explained. FIG. 10 is a schematic structural view illustrating the laser machining device in accordance with the third embodiment of the present invention. As illustrated in FIG. 10, the laser machining device 400 in accordance with this embodiment differs from that of the above-mentioned first embodiment in that it is equipped with a reflective spatial light modulator 403 in place of the reflective spatial light modulator 203 (see FIG. 7).

The reflective spatial light modulator 403 reflects the horizontally incident laser beam L obliquely downward with respect to the horizontal direction. As a consequence, the laser beam L emitted from the reflective spatial light modulator 403 is reflected upward by the second mirror 206a and thereafter intersects the laser beam L incident on the reflective spatial light modulator 403.

The reflective spatial light modulator 403 is shifted rightward in the horizontal direction as compared with the reflective spatial light modulator 203. That is, the reflective spatial light modulator 403 is located deeper in the direction of incidence of the laser beam L than the reflective spatial light modulator 203. This makes it possible to dispose the first lens 241a on the downstream side of the second mirror 206b while setting the distance between the first lens 241a and reflective spatial light modulator 403 at the focal length f1.

This embodiment exhibits an effect similar to that mentioned above, i.e., the effect of suppressing the aberration of the laser beam L converged into the object 1.

In this embodiment, as mentioned above, the reflective spatial light modulator 403 reflects the laser beam L obliquely downward with respect to the horizontal direction, so that the laser beams L incident on and reflected by the reflective spatial light modulator 403 intersect each other. This can reduce the incident angle (reflecting angle) of the laser beam L with respect to the reflective spatial light modulator 403, thereby suppressing the crosstalk between liquid crystal pixels adjacent to each other in the liquid crystal layer 216. Here, the incident angle (reflecting angle) means the angle from the laser beam perpendicularly incident on the reflective spatial light modulator 403.

Fourth Embodiment

Figure 11:
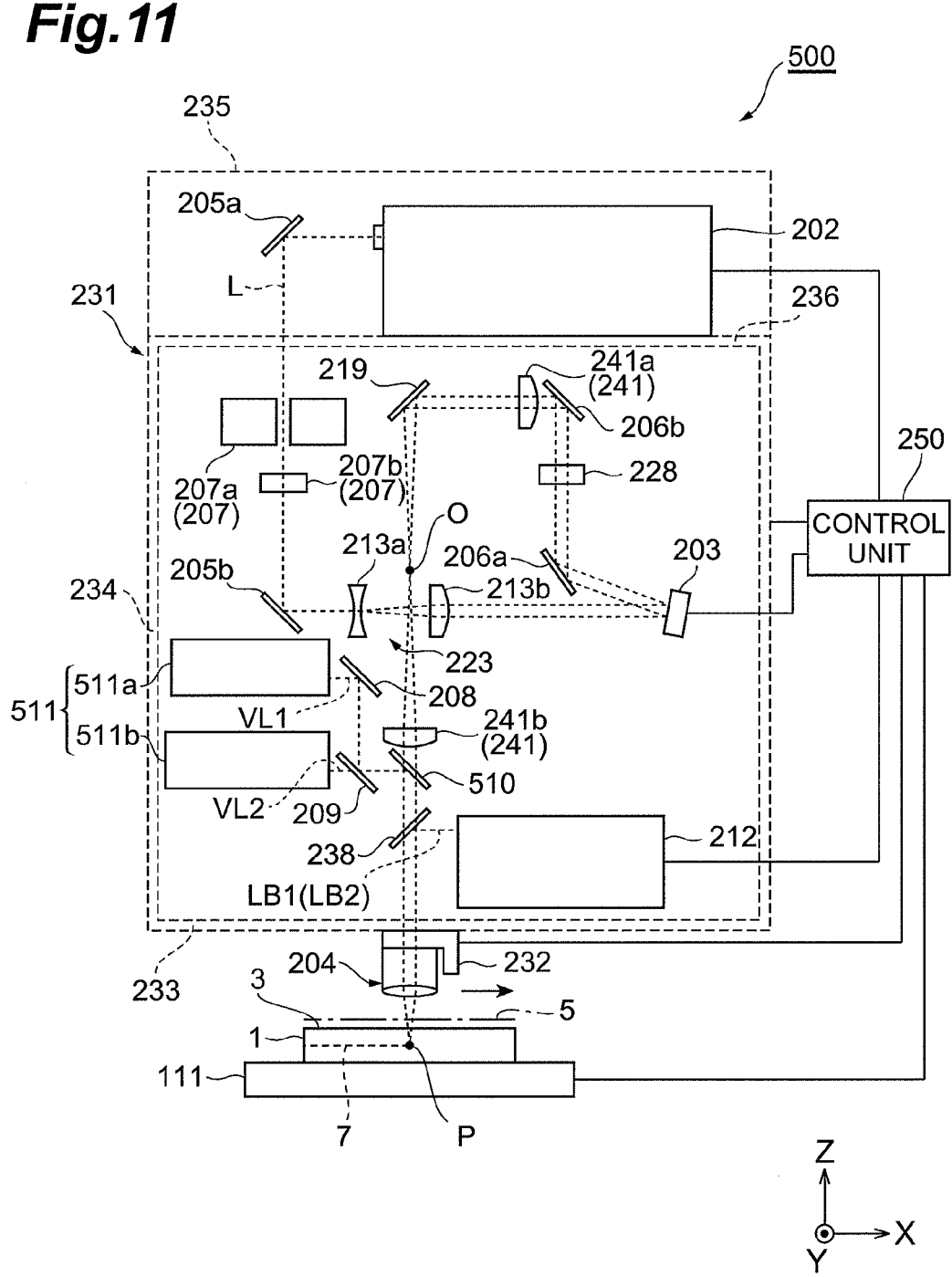
FIG. 11 is a schematic structural diagram of the laser machining device in accordance with a fourth embodiment.

The laser machining device in accordance with the fourth embodiment will now be explained. FIG. 11 is a schematic structural view illustrating the laser machining device in accordance with the fourth embodiment of the present invention. As illustrated in FIG. 11, the laser machining device 500 in accordance with this embodiment differs from that of the above-mentioned first embodiment in that it is equipped with a surface observation unit 511 in place of the surface observation unit 211 (see FIG. 7).

The surface observation unit 511 is disposed at a position symmetrical to the AF unit 212 with respect to the laser beam L within the housing 231. Here, the surface observation unit 511 is located on the left side in the horizontal direction within the housing 231. The surface observation unit 511 is configured like the surface observation unit 211 and has, at least, an observation light source 511a, a detector 511b, and a dichroic mirror 510.

The angle at which the visible light VL1 is incident on the dichroic mirror 510 is equal to the angle at which the AF laser beam LB1 is incident on the AF dichroic mirror 238. On the other hand, the direction in which the visible light VL1 is incident on the dichroic mirror 510 is opposite to the direction in which the AF laser beam LB1 is incident on the AF dichroic mirror 238. That is, the dichroic mirrors 510, 238 are arranged such that their mirror surfaces incline by the same angle in directions different from each other with respect to the optical axis of the laser beam L.

This embodiment exhibits an effect similar to that mentioned above, i.e., the effect of suppressing the aberration of the laser beam L converged into the object 1.

When adjusting the positions of the lenses 241a, 241b of the 4f optical system 241 during the making of the laser machining device 500, for example, it is typically done while detecting the reflected light of the laser beam L from the object 1. If a dichroic mirror with its mirror surface tilted with respect to the optical path of the laser beam L is disposed between the 4f optical system 241 and condenser optical system 204 as mentioned above, the wavefronts of the laser beam L transmitted through the dichroic mirror and its reflected light will be distorted (astigmatism will occur) when the laser beam L diverges or converges. In this case, the reflected light cannot be detected precisely, which makes it difficult to place the lenses 241a, 241b at accurate positions.

In this embodiment, by contrast, the dichroic mirrors 510, 238 whose mirror surfaces are tilted in directions different from each other with respect to the optical axis of the laser beam L are disposed between the 4f optical system 241 and condenser optical system 204 in the optical path of the laser beam L. Hence, the wavefront of the laser beam L caused by the dichroic mirror 510 and the wavefront of the laser beam L caused by the AF dichroic mirror 238 act such as to cancel each other out. That is, even when the laser beam L transmitted through the dichroic mirrors 510, 238 diverges or converges, the wavefront distortion of the reflected light can be reduced, whereby the 4f optical system 241 can be adjusted precisely.

Fifth Embodiment

Figure 12:
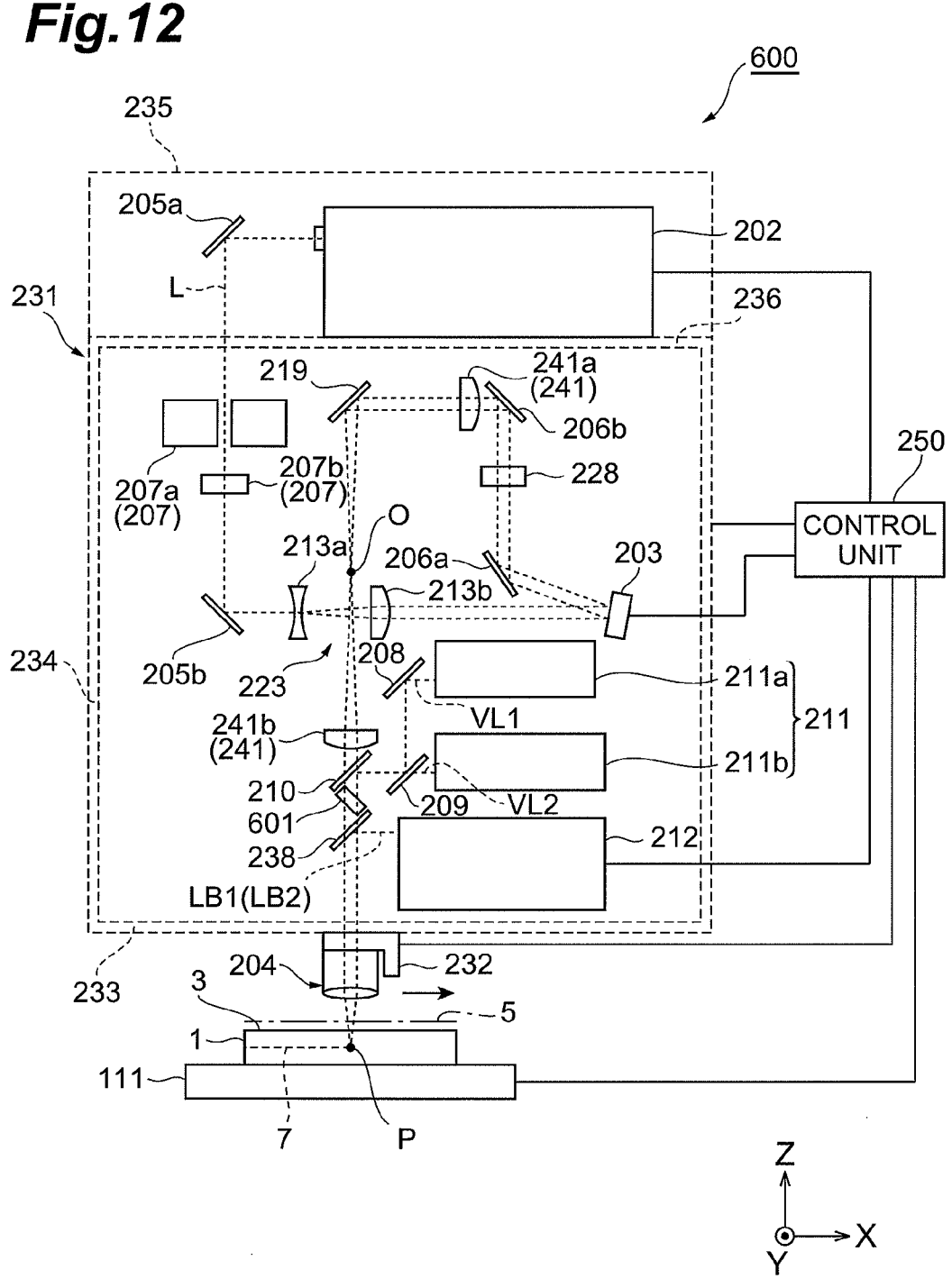
FIG. 12 is a schematic structural diagram of the laser machining device in accordance with a fifth embodiment.

The laser machining device in accordance with the fifth embodiment will now be explained. FIG. 12 is a schematic structural view illustrating the laser machining device in accordance with the fifth embodiment of the present invention. As illustrated in FIG. 12, the laser machining device 600 in accordance with this embodiment differs from that of the above-mentioned first embodiment in that it further comprises a correction plate 601.

The correction plate 601, which is used for reducing the wavefront distortion of the laser beam L converged by the condenser optical system 204, is disposed between the dichroic mirrors 210, 238 in the optical path of the laser beam L.

This embodiment exhibits an effect similar to that mentioned above, i.e., the effect of suppressing the aberration of the laser beam L converged into the object 1. Also, since the wavefront distortion of the laser beam L converged by the condenser optical system 204 is reduced by the correction plate 601, this embodiment can decrease the wavefront distortion in the reflected light of the laser beam L when adjusting the 4f optical system 241 because of the reason mentioned above, thereby making it possible to adjust the 4f optical system 241 precisely.

Sixth Embodiment

Figure 13:
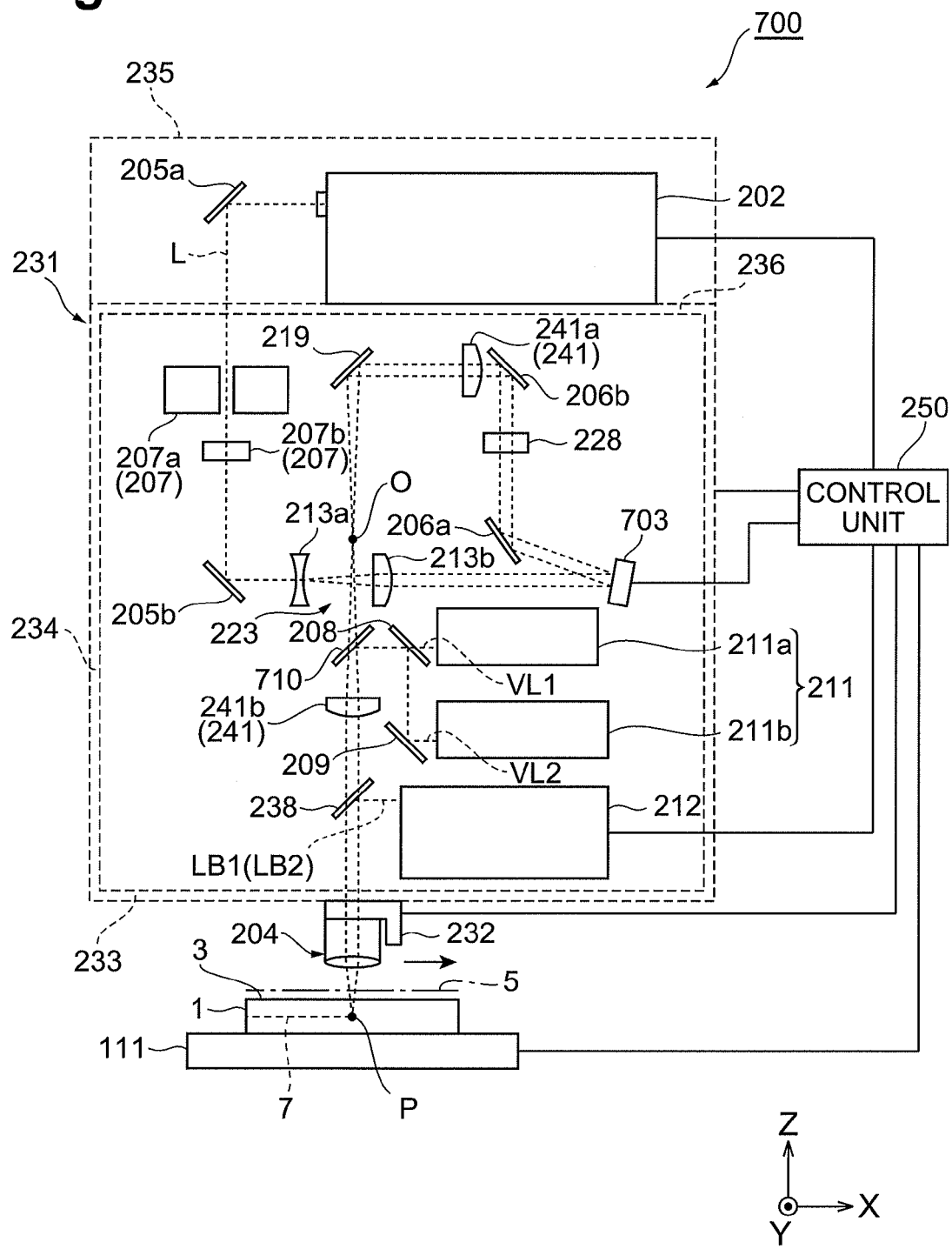
FIG. 13 is a schematic structural diagram of the laser machining device in accordance with a sixth embodiment.

The laser machining device in accordance with the sixth embodiment will now be explained. FIG. 13 is a schematic structural view illustrating the laser machining device in accordance with the sixth embodiment of the present invention. As illustrated in FIG. 13, the laser machining device 700 in accordance with this embodiment differs from that of the above-mentioned first embodiment in that it comprises a reflective spatial light modulator 703 and a dichroic mirror 710 in place of the reflective spatial light modulator 203 and dichroic mirror 210 (see FIG. 7).

The reflective spatial light modulator 703 modulates (corrects) the laser beam L such that the aberration and astigmatism of the laser beam L converged into the object 1 are their respective predetermined levels or less. The dichroic mirror 710 is disposed between the mirror 219 and second lens 241b in the optical path of the laser beam L.

This embodiment exhibits an effect similar to that mentioned above, i.e., the effect of suppressing the aberration of the laser beam L converged into the object 1. It can also decrease the distance between the second lens 241b and the condenser lens of the condenser optical system 204, so that the optical path length of the laser beam L as a whole becomes shorter, thereby reducing the size of the laser machining device 700.

Since the dichroic mirror 710 is disposed upstream of the second lens 241b, the laser beam L is incident on the dichroic mirror 710 while diverging, so that astigmatism occurs in the laser beam L in this embodiment. However, the laser beam L is modulated by the reflective spatial light modulator 703 such that the astigmatism is corrected so as to become a predetermined level or less, whereby the astigmatism can be inhibited from occurring in the laser beam L converged into the object 1 in this embodiment.

Though preferred embodiments of the present invention have been explained in the foregoing, the present invention is not limited to the above-mentioned embodiments. For example, though each of the above-mentioned embodiments comprises the surface observation unit 211 (511) and AF unit 212 while the dichroic mirrors 210 (510, 710), 238 are disposed between the 4f optical system 241 and condenser optical system 204, the AF unit 212 may be provided alone while placing only the AF dichroic mirror 238 between the 4f optical system 241 and condenser optical system 204.

Though each of the above-mentioned embodiments comprises a pair of first mirrors 205a, 205b and a pair of second mirrors 206a, 206b, it will be sufficient if the first and second mirrors are provided at least two each. While the above-mentioned embodiments are configured such that the mirrors 205a, 205b, 206a, 206b are axially rotatable, it will be sufficient if their reflecting directions (reflecting angles) are adjustable without being restricted thereto.

The surface on which the laser beam is incident when forming the modified region 7 is not limited to the front face 3 of the object 1 but may be its rear face as well. A plurality of rows of the modified region 7 may be formed along the line to cut 5 as a matter of course.

More preferably, in the present invention, a change in the wavefront form at the time when the laser beam propagates from the reflective spatial light modulator to the condenser optical system is determined by measurement or the like, and wavefront shaping (aberration shaping) pattern information taking account of the change in the wavefront form is fed into the reflective spatial light modulator.

INDUSTRIAL APPLICABILITY

The present invention can suppress the aberration of the laser beam converged into the object to be machined.

REFERENCE SIGNS LIST

1 . . . object to be machined; 7 . . . modified region; 100, 200, 300, 400, 500, 600, 700 . . . laser machining device; 101, 202 . . . laser light source; 105 . . . condenser lens (condenser optical system); 203, 403, 703 . . . spatial light modulator; 204 . . . condenser optical system; 205a, 205b . . . first mirror; 206a, 206b . . . second mirror; 210, 238, 510, 710 . . . dichroic mirror; 212 . . . AF unit (converging point position control means); 223 . . . beam expander; 241 . . . 4f optical system (adjustment optical system); 301 . . . beam homogenizer; L . . . laser beam; P . . . converging point

The invention claimed is:

1. A laser machining device for forming a modified region in an object to be machined by irradiating the object with a laser beam while locating a converging point within the object, the laser machining device comprising:
 a laser light source for emitting the laser beam;
 a measurement laser beam light source unit for emitting a measurement laser beam;
 a reflective spatial light modulator for modulating the laser beam emitted from the laser light source;
 an adjustment optical system for adjusting a wavefront form of the laser beam modulated by the reflective spatial light modulator;
 a condenser optical system for converging the laser beam adjusted by the adjustment optical system into the object; and
 converging point position control means for locating the converging point at a predetermined position of the object by irradiating the object with the measurement laser beam and receiving reflected light of the measurement laser beam from the object;
 wherein, in an optical path of the laser beam,
 at least two first mirrors for reflecting the laser beam are disposed between the laser light source and the reflective spatial light modulator, the at least two first mirrors configured such that reflecting directions of the laser beam are adjustable, so as to regulate the position and incident angle of the laser beam with respect to the reflective spatial light modulator,
 at least two second mirrors for reflecting the laser beam are disposed between the reflective spatial light modulator and the adjustment optical system, the at least two second mirrors configured such that reflecting directions of the laser beam are adjustable, so as to regulate the position and incident angle of the laser beam with respect to the adjustment optical system, and
 a dichroic mirror for transmitting therethrough the laser beam and reflecting the measurement laser beam and the reflected light of the measurement laser beam, the dichroic mirror is disposed between the adjustment optical system and the condenser optical system, wherein
 the laser beam is a machining laser beam having a wavelength chosen such that the object is transmissive to the machining laser beam, the measurement laser beam has a wavelength different from the wavelength of the machining laser beam, the measurement laser beam is emitted from the measurement laser beam light source unit, condensed by the condenser optical system, reflected on the surface of the object, condensed by the condenser optical system, and received by the measurement laser beam light source unit, the adjustment optical system comprises at least a first lens and a second lens having a confocal point therebetween, the first and the second lenses are arranged between the reflective spatial light modulator and condenser optical system such that the lenses constitute a double telecentric optical system, the reflective spatial light modulator receives a wavefront data shaping pattern for causing phase modulation of a beam wavefront of the laser beam incident on the reflective spatial light modulator, and the beam wavefront of the laser beam reflected by the reflective spatial light modulator is subjected to phase modulation in accordance with the wavefront data shaping pattern, and the laser beam reflected by the second mirror is transmitted through the first lens of the adjustment optical system toward the confocal point so as to converge, diverges through the confocal point, intersects the optical path between the first mirror and reflective spatial light modulator, and passes through the second lens of the adjustment optical system.

2. The laser machining device according to claim 1, wherein the reflective spatial light modulator modulates the laser beam such that the laser beam converged into the object has aberration at a predetermined level or less.

3. The laser machining device according to claim 1, wherein a beam expander or beam homogenizer is disposed between one of the at least two first mirrors and the reflective spatial light modulator in the optical path of the laser beam.

* * * * *